United States Patent [19]
Harrison et al.

[11] Patent Number: 5,495,795
[45] Date of Patent: Mar. 5, 1996

[54] JUICE EXTRACTORS

[75] Inventors: Robert G. Harrison, Poulsbo, Wash.; Bong-Sool Kim, Pusan, Rep. of Korea; Robert D. Lamson, Seattle, Wash.

[73] Assignee: Trillium Health Products, Inc., Seattle, Wash.

[21] Appl. No.: 2,248

[22] Filed: Jan. 8, 1993

Related U.S. Application Data

[63] Continuation-in-part of Ser. No. 811,572, Dec. 20, 1991, Pat. No. 5,355,784.

[51] Int. Cl.$^6$ .............................. A23N 1/00; A23N 1/02
[52] U.S. Cl. ................. 99/492; 99/511; 99/513; 241/37.5; 241/92
[58] Field of Search .............. 99/495, 492, 509–513; 210/360.1, 380.1, 369, 374; 241/37.5, 92, 282.1, 282.2, 199.12; 366/314, 197, 200, 601; 494/36, 43, 56, 58; D7/665

[56] References Cited

U.S. PATENT DOCUMENTS

| | | | |
|---|---|---|---|
| 3,575,223 | 4/1971 | Hickel et al. | 99/501 |
| 4,080,885 | 3/1978 | Pauty | 99/501 |
| 4,681,031 | 7/1987 | Austad | 99/513 |
| 4,744,522 | 5/1988 | Borgmann et al. | 241/92 |
| 5,222,430 | 6/1993 | Wang | 99/511 |

Primary Examiner—Timothy F. Simone
Attorney, Agent, or Firm—Richard D. Multer; Hughes, Multer & Schach

[57] ABSTRACT

Apparatus for extracting juice from comestibles such as fruits and vegetables. The extractor has a base which includes a motor with a vertically oriented output shaft and a housing for the motor. A blade basket detachably mounted on and driven by the output shaft comminutes the comestibles and extracts their juice, and a juice bowl surrounding the blade basket collects the juice. A safety interlock keeps the motor from being turned on unless the juice bowl is locked to the base of the juice extractor and a blade basket isolating cover is locked to the juice bowl.

3 Claims, 14 Drawing Sheets

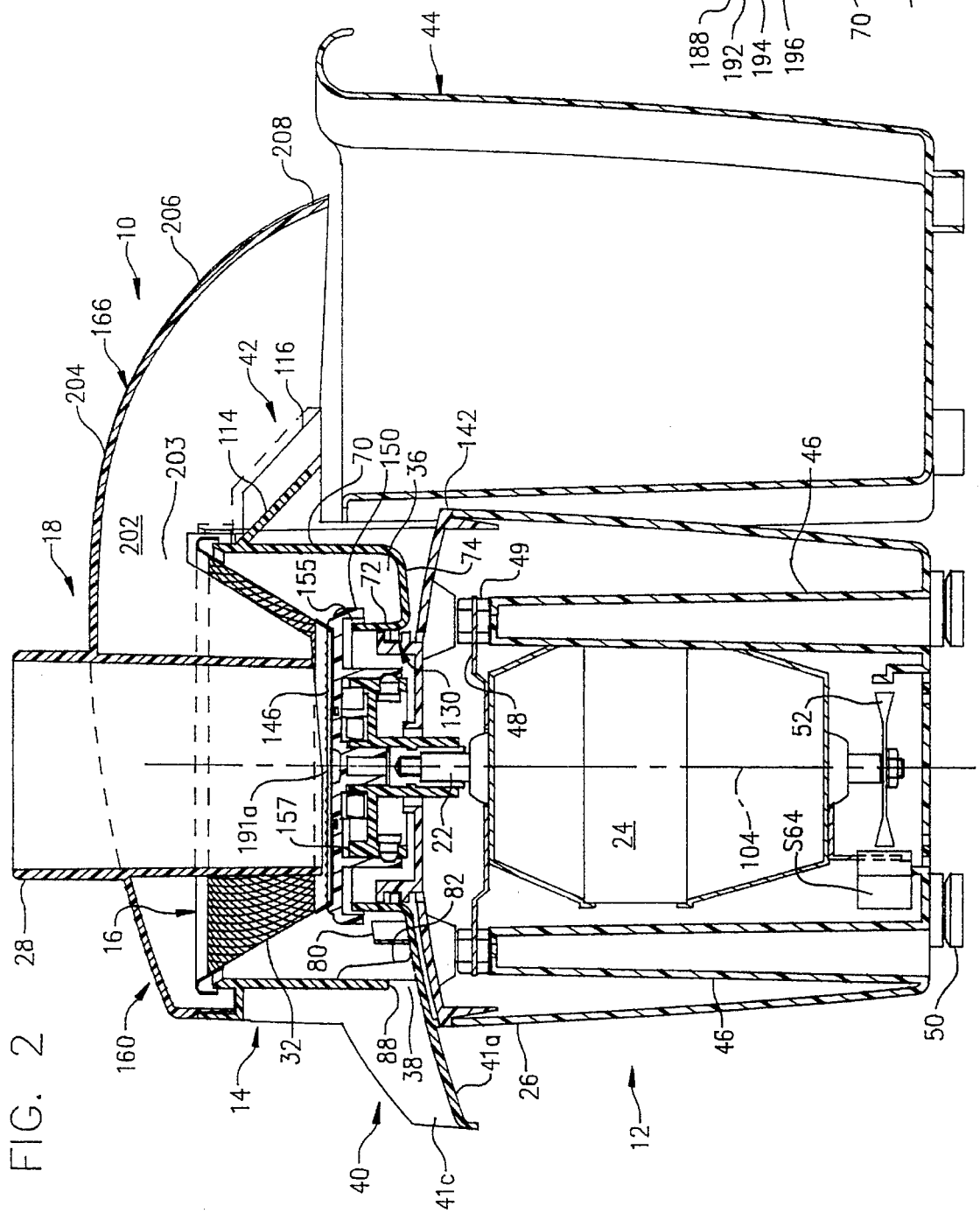
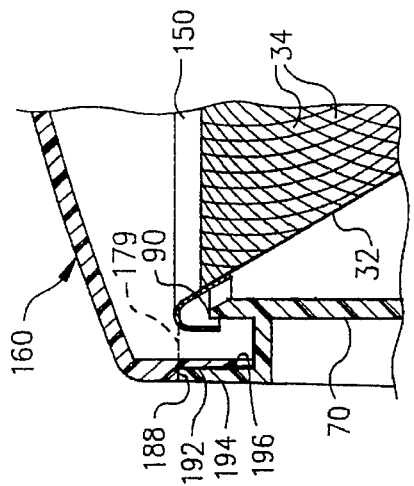

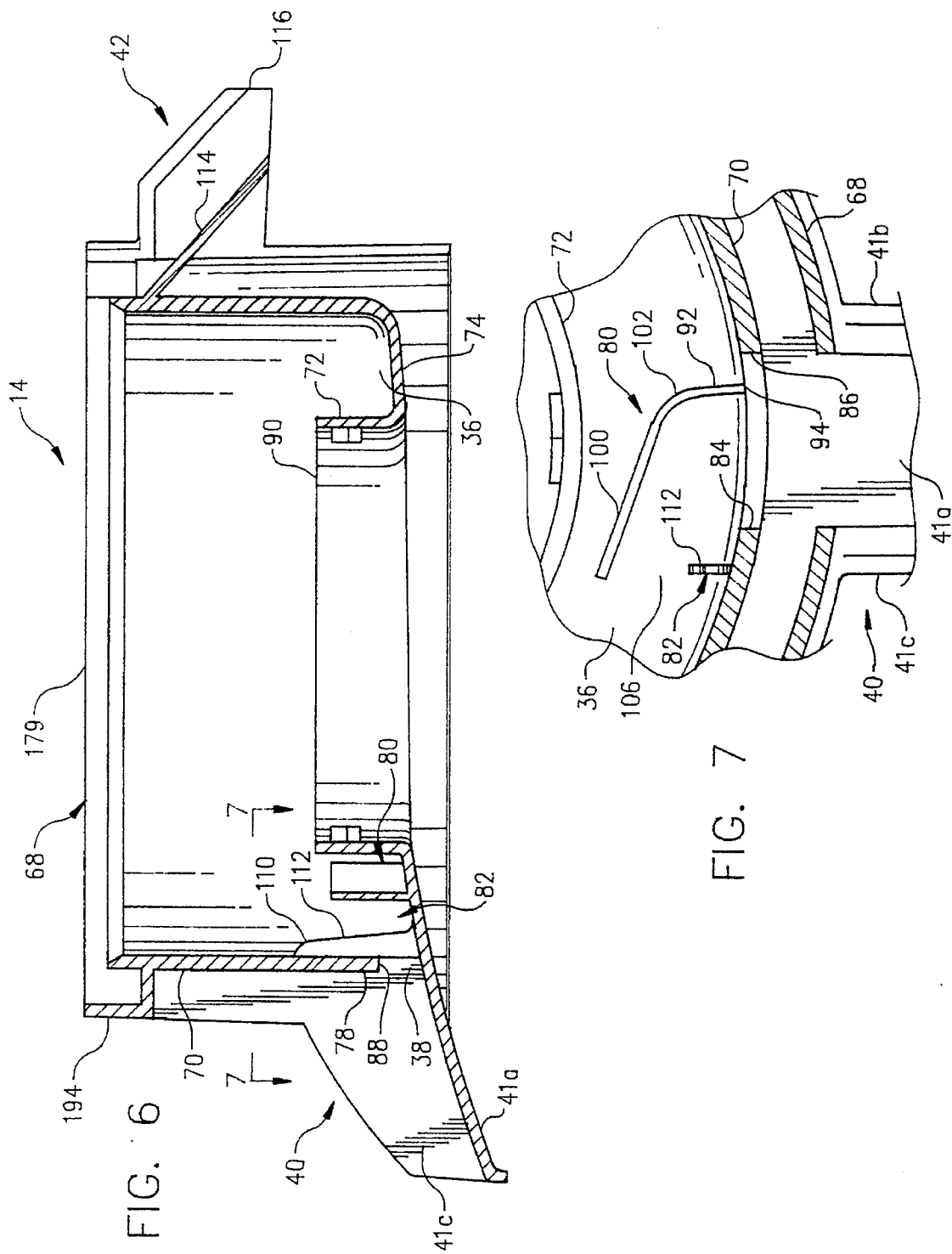

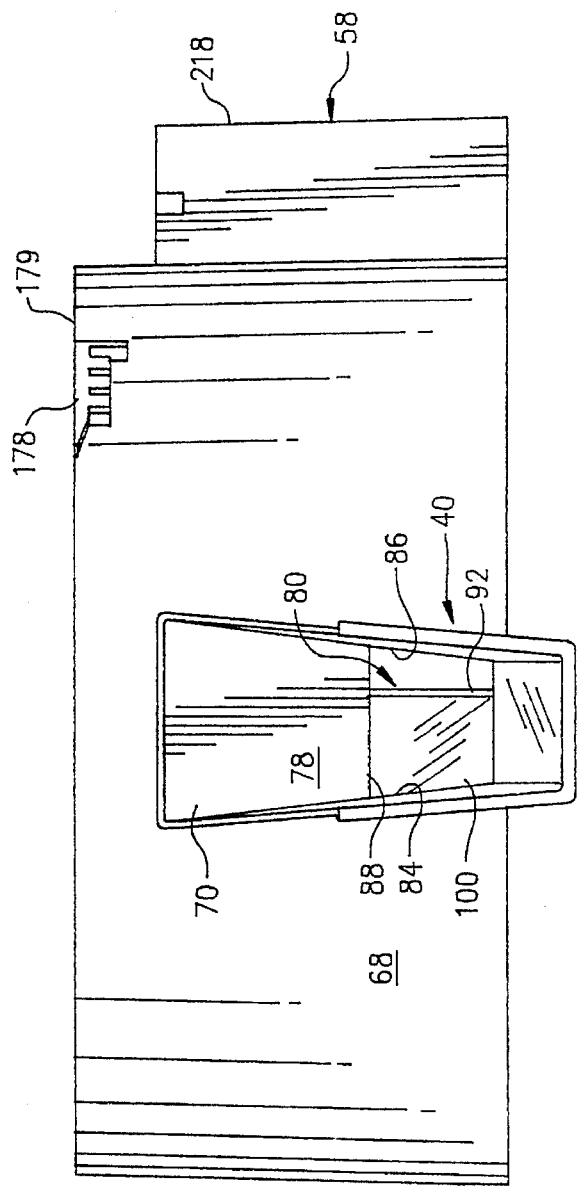
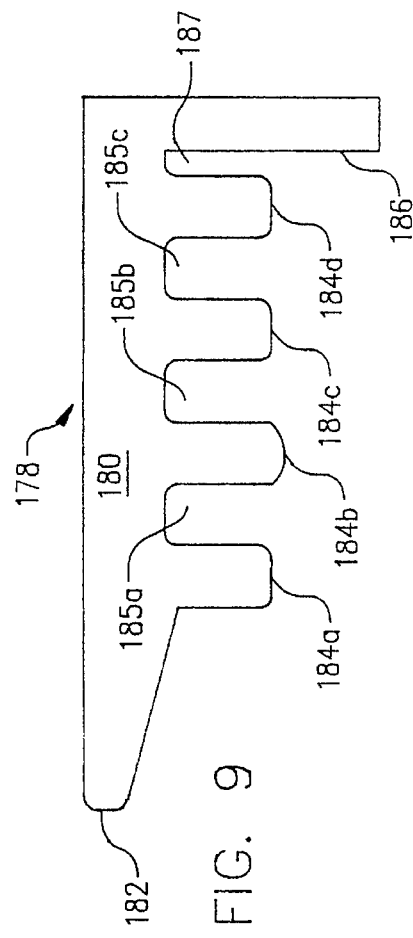
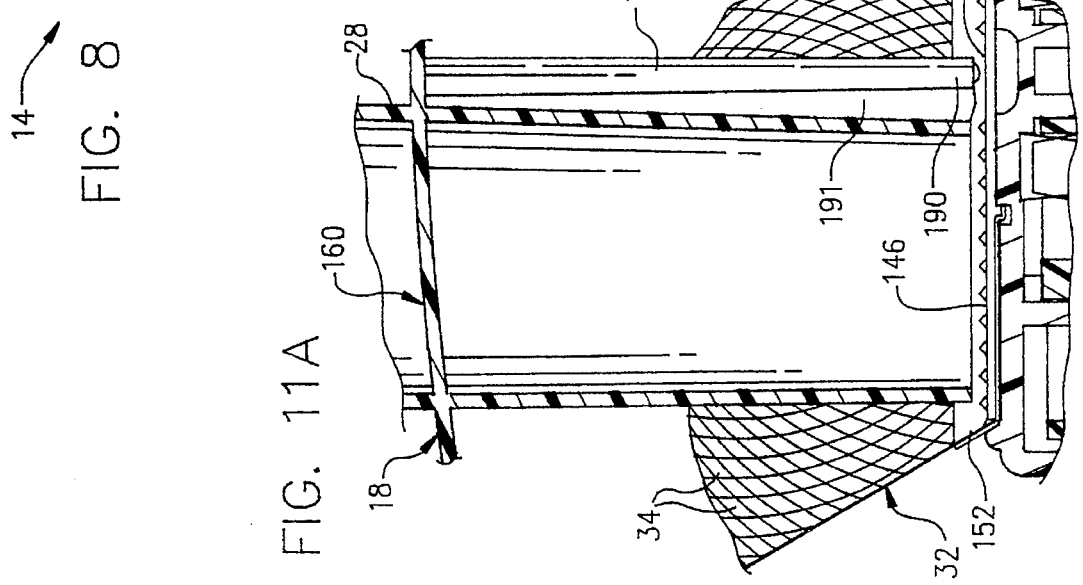

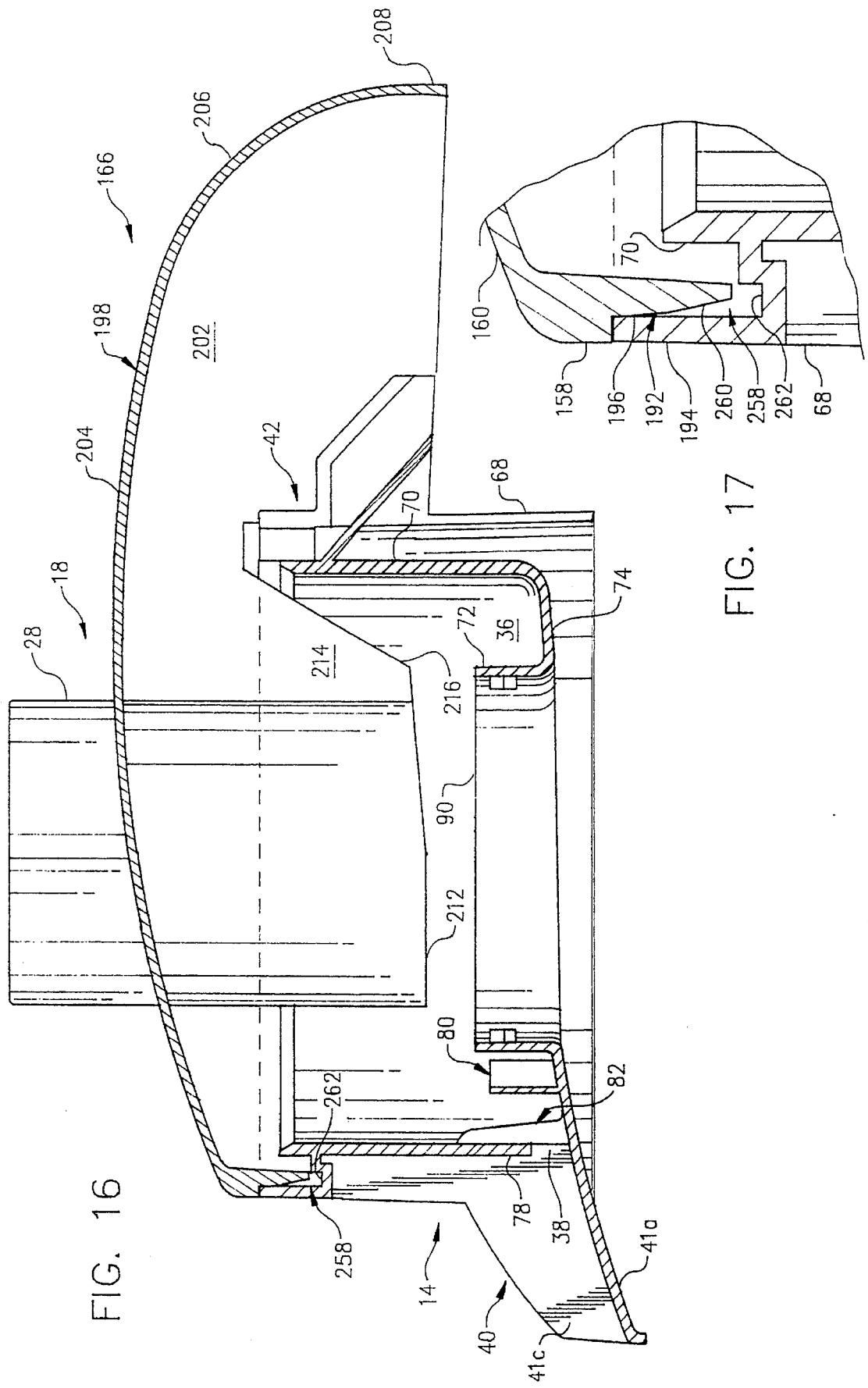

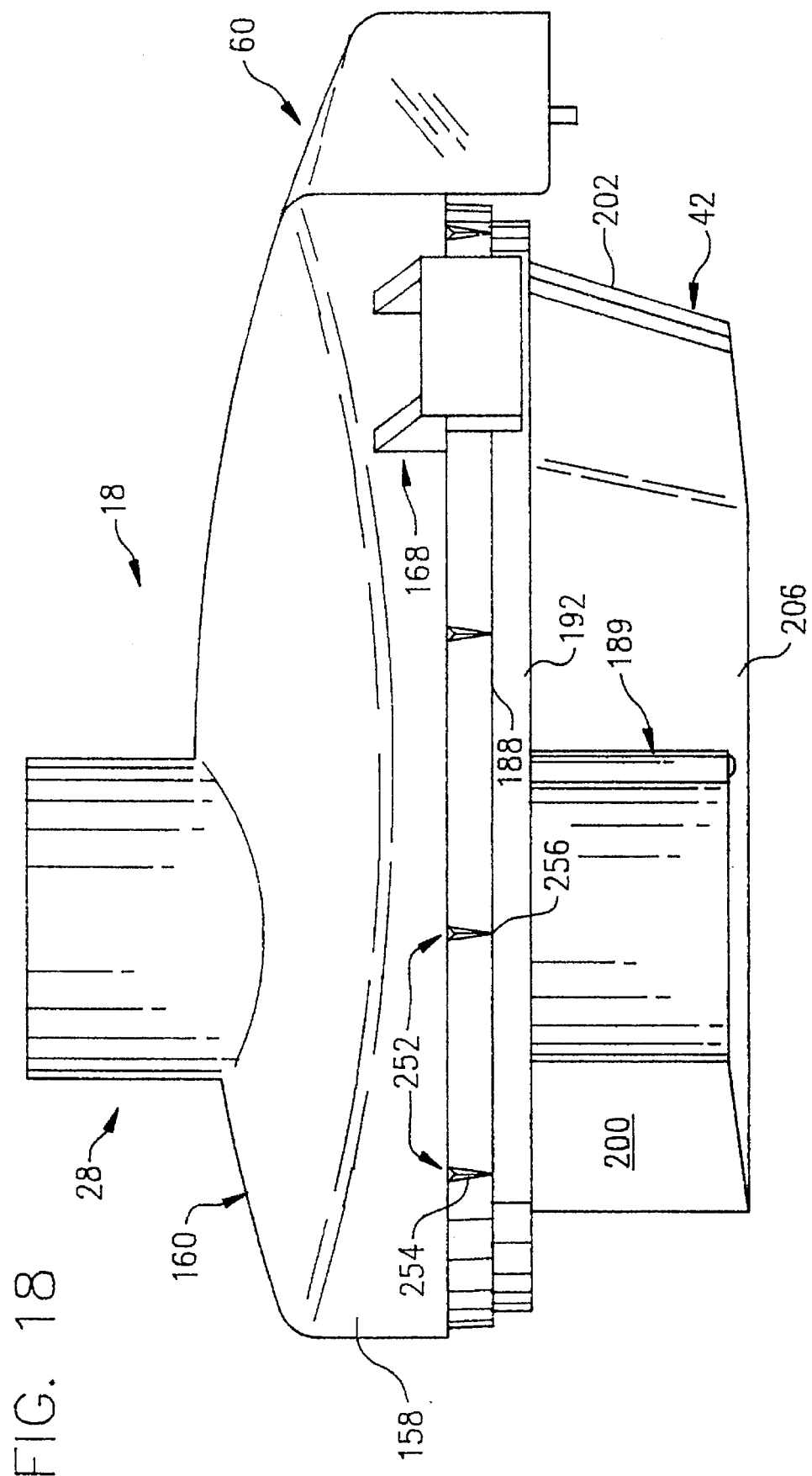

5,495,795

JUICE EXTRACTORS

RELATION TO OTHER APPLICATION

This application is a continuation-in-part of application Ser. No. 811,572 filed 20 Dec. 1991 now U.S. Pat. No. 5,355,784 for JUICE EXTRACTORS.

TECHNICAL FIELD OF THE INVENTION

The present invention relates to novel, improved apparatus for extracting juice from comestibles such as fruits and vegetables.

BACKGROUND OF THE INVENTION

Juice extractors commonly have a base which includes a motor and controls therefor, a centrifugal type blade basket for comminuting comestibles to release their juices, a filter for separating the comminuted comestibles into juice and pulp, a juice bowl in which the juice collects, and a cover for the juice bowl.

Juicer extractors are subject to a variety of design considerations. It is generally desirable to: (a) maximize the amount of juice extracted, while (b) minimizing the amount of pulp in the juice. These goals must be obtained within such parameters as manufacturing costs; ease of assembly and use; and user safety.

Additionally, at least certain components of these juice extractors must be cleaned after use. Current juicers can be difficult for certain persons, such as the elderly, to disassemble for cleaning. This is particularly true of the blade basket which, because it is located within the juice bowl, is often difficult to remove from the motor shaft.

Because the juice extracting process involves rapidly spinning blades, precautions must be taken to reduce the risk of injury caused by the user coming into contact with the moving blades. These precautions usually include a safety interlock switch for the motor that rotates the blades. Interlock switch systems sometimes hinder the operation of the juice extractor and tempt the user to bypass them. Also, prior art interlock systems are often not inexpensive to implement, a requirement if the extractor is to be sold at a reasonable price.

In order to keep manufacturing costs to a minimum, the juice bowl, which collects the juice and funnels it to the exterior of the juice extractor, should be as compact as possible. However, in extractors with compact juice bowls, the spinning blade basket can cause juice to be propelled at a considerable velocity through the juice discharge spout and beyond the container designed to collect the juice. This causes a loss of juice, creates a mess in the working area, and may soil the operator.

Commonly, no provision is made in prior art juicers for damping or suppressing vibrations generated by the moving parts of the extractor. This vibration may be severe enough to cause the extractor to walk or scoot off of the support surface on which it is placed.

The foregoing and other drawbacks of heretofore available juicers are eliminated, and many other advantages provided, by the novel juice extractors disclosed in parent application No. 07/811,572 (the "'572" application"). Those juice extractors have: a base which includes a housing and a motor; a rotating blade basket detachably coupled to the motor output shaft for separating comestibles into pulp and juice; a bowl surrounding a substantial portion of the blade basket for collecting the juice; a juice bowl cover; and an arrangement for so mounting the juice bowl on the juice extractor base that: (a) when the bowl is rotated in one direction relative to the base, the bowl is locked to the housing; and (b) when the bowl is rotated in the opposite direction, the bowl is unlocked and displaced away from the motor drive shaft to detach the blade basket from the drive shaft. The blade basket of the juice extractor has an array of knives or blades for shredding the comestibles being juiced and an inverted, apertured, frustoconical filter through which the juice is expressed by centrifugal force as the blade basket rotates.

Assembly of the blade basket and the juice bowl to the base of the juice extractor is facilitated by a motor output shaft-to-blade basket drive coupling which allows the blade basket and the output shaft to be rotated relative to each other to couple them together. Thereafter, complementary surfaces on cooperating elements of the coupling so contact each other when the motor output shaft is rotated that the drive hub imparts the rotation of the output shaft to the blade basket.

The juice bowl has an inner wall which keeps juice from splashing out of the bowl as it flows into the bowl from the blade basket filter. It also has a spout through which the juice flows to a pitcher or other container. A novel baffle arrangement keeps the juice from splashing as it flows into the spout from the juice bowl.

An interlock keeps the motor in the juice extractor base from being turned on unless the juice bowl is locked to the housing of the juice extractor base and a cooperating cover is locked in place on the juice bowl. This keeps the operator's fingers and foreign objects away from the blade basket and prevents splashing.

Vibrations of the juice extractor motor and the blade basket are absorbed by a novel arrangement which supports the motor in, but efficiently isolates it from, the housing of the juice extractor base. Vibration absorbing feet absorb additional mechanical energy and help keep the juice extractor from walking across the surface on which it is supported.

Notwithstanding its advantages over other juice extractors, there are areas in which the juice extractors disclosed in the '572 application could advantageously be improved. Specifically, there are circumstances in which juice may escape from the juice bowl of those extractors or be sprayed through the juice discharge spout onto the work surface or even the operator of the juice extractor, notwithstanding the baffle arrangement employed to keep this from happening. At times, pulp exiting the juice bowl may hang up in the pulp discharge chute, requiring that the operator turn off the machine, remove the juice bowl cover, and clean out the pulp discharge chute. Also, it has been found that it is possible to assemble the covers of the juice extractors disclosed in the '572 application to their juice bowls in a manner which defeats the safety interlock. This allows the juice extractor motor to be turned on, even though the cover is not properly and securely locked to the juice bowl.

SUMMARY OF THE INVENTION

There have now been invented and disclosed herein certain new and novel juice extractors which have all of the advantages of those disclosed in the '572 application and, in addition, are superior to the latter in preventing leakage and splashing of juice from the juice bowl and in discharging pulp from the juice bowl. Also, the motors of the novel juice extractors disclosed herein cannot be turned on unless the cover of the extractor is securely locked to the juice bowl of the extractor in the intended manner to provide safe and splash-free operation.

Any or all of several innovations may be employed to prevent leakage of the expressed juice from the extractor's juice bowl. One is to increase the juice bowl volume. Also, it has been found that leakage can be suppressed by configuring the juice bowl cover so that it fits within, rather than around, the upper margin of the juice bowl.

With the lower margin of the juice bowl cover tightly fitted in the juice bowl, capillary action may allow juice to leak through the gap between the juice bowl and juice bowl cover. This can be prevented with circumferentially spaced features which space the apposed margins of the juice bowl and cover sufficiently far apart to eliminate the just-discussed capillary leakage of collected juice. Also, an upwardly opening, circumferential well or recess for separating the juice bowl cover from the bottom wall of the juice bowl and tapering of the lower part of the juice bowl cover side wall can be utilized to inhibit the leakage of juice through the juice bowl/juice bowl cover gap.

The juice extractors disclosed in the '572 application have a pulp discharge chute which is an integral part of the juice bowl cover. That chute has a generally horizontal top wall and a vertical wall which meets the top wall in a sharp angle at the far or discharge end of the chute. The pulp exiting the juice basket through this chute may tend to hang up in the corner between the discharge chute top and rear walls. In the juice extractors disclosed herein, this problem is solved in an elegant, expeditious, and inexpensive fashion by substituting for the top and rear walls of the previously invented juice extractors an upper wall which is continuously curved and therefore has no corners for pulp to hang up in.

The problem of the juice extractor perhaps being turned on without the cover being securely locked in place is solved in the juice extractors disclosed herein in a similarly superior manner. Specifically, the juice extractors disclosed in the '572 application employ a pair of diametrically opposed bayonet connections to lock the juice bowl cover to the juice bowl; and the locking together of the components of these connections depresses an interlock actuator, closing an interlock switch and allowing the juice extractor motor to be turned on by then manually closing a main switch. There is sufficient flexibility in the vertical wall of the juice bowl cover that this wall can bend and allow one connection to be made even though the diametrically opposed one is not. As a result, the cover may be misassembled to the juice bowl in a manner which allows the interlock switch to be closed even though one of the two bayonet connections required for safe and splash-free operation of the juice extractor has not been made.

In the novel juice extractors disclosed herein, the just-discussed problem is solved by configuring and dimensioning the mating components of the juice bowl and juice bowl cover so that these components will not deflect and allow only one of the two diametrically opposed connections to be made. Consequently, if one connection is made, the other one will also be made; and the interlock switch actuator cannot be depressed and the juice extractor motor turned on unless the cover is correctly and securely locked to the juice bowl.

Important objects, features, and advantages of the invention will be apparent to the reader from the foregoing and the appended claims and as the ensuing detailed description and discussion of the invention proceeds in conjunction with the accompanying drawings.

BRIEF DESCRIPTION OF THE DRAWINGS

FIG. 2 is a vertical section through the juice extractor of FIG. 1;

FIGS. 3A and 3B are fragments of FIG. 2 drawn to enlarged scales;

FIG. 6 is a section through the juice bowl, taken substantially along line 6—6 of FIG. 5;

FIG. 7 is a fragmentary view of the juice bowl, looking in the direction of line 7—7 in FIG. 6;

FIG. 8 is an end view of the juice bowl, looking in the direction of arrows 8—8 in FIG. 5;

FIG. 9 is a front view of one of two juice bowl-associated fittings used in locking the juice bowl and cover of the FIG. 1 juice extractor together to provide safe and splash-free operation of the extractor;

FIG. 11a is a view of the juice bowl cover looking in the direction of arrows 11A—11A in FIG. 10;

FIG. 16 is a vertical section through an assembly of a juice bowl as shown in FIGS. 5–8 and an alternate form of juice bowl cover embodying the principles of the present invention; these components are designed to even more effectively keep juice from leaking through the gap between them;

FIG. 17 is a fragment of FIG. 16 drawn to an enlarged scale;

FIG. 18 is a side view of the juice bowl cover shown in FIG. 16; and

DETAILED DESCRIPTION OF THE INVENTION

Figure 1:
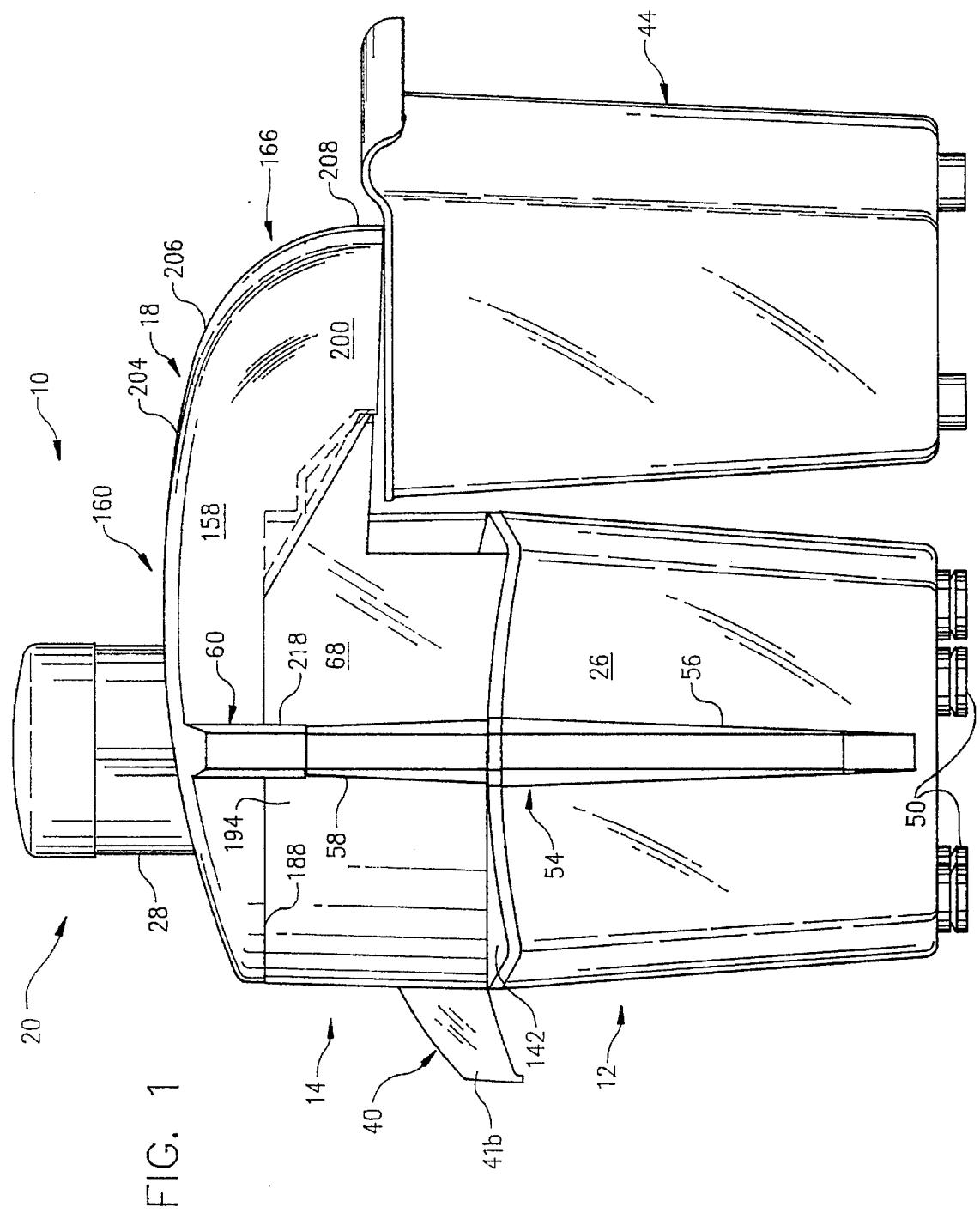
FIG. 1 is a side view of a juice extractor embodying the principles of the present invention.

Referring now to the drawing, FIGS. 1 and 2 depict a juice extractor 10 constructed in accord with, and embodying, the principles of the present invention. Juice extractor 10 has the following major components: (a) a base 12; (b) a juice bowl 14; (c) a blade basket 16; (d) a juice bowl cover 18; and (e) a feed plunger 20. Juice bowl 14 is assembled to juice extractor base 12. The blade basket 16 is surrounded by the juice bowl 14. It engages, and is rotated by, the output shaft 22 of a motor 24 in the housing 26 of base 12. Juice bowl cover 18 is assembled to the juice bowl 14 to isolate the rotating blade basket 16 from the surrounding environment and to confine the comestibles being processed, the extracted juice, and the pulp to the juice bowl.

Fruits and vegetables are forced through a feed tube 28 in juice bowl cover 18 by plunger 20. Rotating blades 30 at the bottom of blade basket 16 comminute the comestibles introduced into blade basket 16 through feed tube 28.

The comminuted comestibles are pressed by centrifugal force against the inverted-frustoconical filter 32 of blade basket 16, and the juice is expressed through holes 34 in filter 32. This juice collects in a sump 36 in the bottom of juice bowl 14. From sump 36, the juice flows through a juice outlet 38 into an external, open top, U-sectioned spout 40 with a bottom wall 41a and side walls 41b and 41c. Spout 40 directs the juice to an appropriate juice container (not shown). The pulp cannot pass through filter holes 34 and is expelled by the rotation of basket 16 over the top of this basket and through a pulp chute 42 into pulp container 44.

The motor 24 of juice extractor 10 is suspended in the housing 26 of juice extractor base 12 by three hollow legs or columnar supports 46 (two shown in FIG. 2) on which the integral mounting flanges 48 of motor 24 are seated. Resilient grommets 49 isolate juice extractor motor 24 from motor-supporting legs 46. They thereby absorb the vibration generated by the motor and the rotating blade basket 16 and keep this vibration from being transmitted to juice extractor base 12.

To further promote vibration-free operation of juice extractor 10, resilient feet 50 are attached to the bottom of juice extractor base 12. These feet keep vibrations from being transferred to the surface on which the juice extractor 10 is placed and also allow a large frictional force to be generated between the juice extractor and the supporting surface. The result is that feet 50 keep the juice extractor from being walked along the supporting surface by vibration generated by motor 24 and blade basket 16 and not absorbed by the vibration absorbing grommets 49 which isolate motor 24 from its columnar supports 46.

A fan 52 is mounted on the lower end of motor output shaft 22. This fan draws cooling air into the housing 26 of base 12 through holes (not shown) in the bottom of the housing.

A motor safety interlock column 54 with a base segment 56, a juice bowl segment 58, and a juice bowl cover segment 60 extends vertically along the right-hand side of juice extractor 10. The juice bowl interlock segment 58 is so mechanically related with the base and cover segments 56 and 60 that, only when all of these interlock column segments are properly aligned by locking the juice bowl to the base and the cover to the juice bowl, will the motor 24 be allowed to operate. Accordingly, the interlock in which column 54 is incorporated prevents the user from accidentally coming into contact with the rotating blade basket 16 while juice extractor 10 is running.

The switch S62 of the safety interlock and a main, operator-actuated switch S64 (FIG. 4) are mounted in the housing 26 of juice extractor base 12. A manual actuator 66 for main switch S64 is accessible to the juice extractor operator from the exterior of base housing 26. By depressing actuator 66, main switch S62 is alternately opened and closed to activate and deactivate motor 24.

Referring now to FIGS. 1, 2, 4–6, and 8, the juice bowl 14 of juice extractor 10 is a (typically molded plastic) component having three concentric, cylindrical, vertically extending walls: an outer wall 68, a splash wall 70, and an inner wall 72. A generally horizontal bottom wall 74 spans splash wall 70 and inner wall 72 and cooperates with them to form the annular juice collecting sump 36 in the bottom of juice bowl 14.

Juice outlet 38 is located in splash wall 70. It allows juice to flow into external juice spout 40 from internal sump 36.

Juice extracted from the comestibles processed in juice extractor 10 is propelled against juice bowl splash wall 70 at high speed by the centrifugal force which the rotating blade basket 16 generates. This juice is kept from splashing through the juice outlet 38 in the splash wall by a juice barrier or splash guard 78, a juice baffle 80, and a juice guide 82.

As is shown in FIGS. 2, 3A, and 5–7, splash guard 78 is an integral, depending extension of juice bowl splash wall 70. This barrier extends from side 84 to side 86 of juice outlet 38 and terminates in a bottom edge 88 which is also the upper edge of juice outlet 38. This edge is located at a level well below the bottom of juice basket 16. Juice expelled by centrifugal force from basket 16 in the vicinity of juice outlet 38 consequently does not splash into spout 40. Instead, this juice strikes splash guard 78, trickles down this component, and flows gently through outlet 38 into spout 40 with the remainder of the juice expressed through juice basket filter 32.

Figure 5:
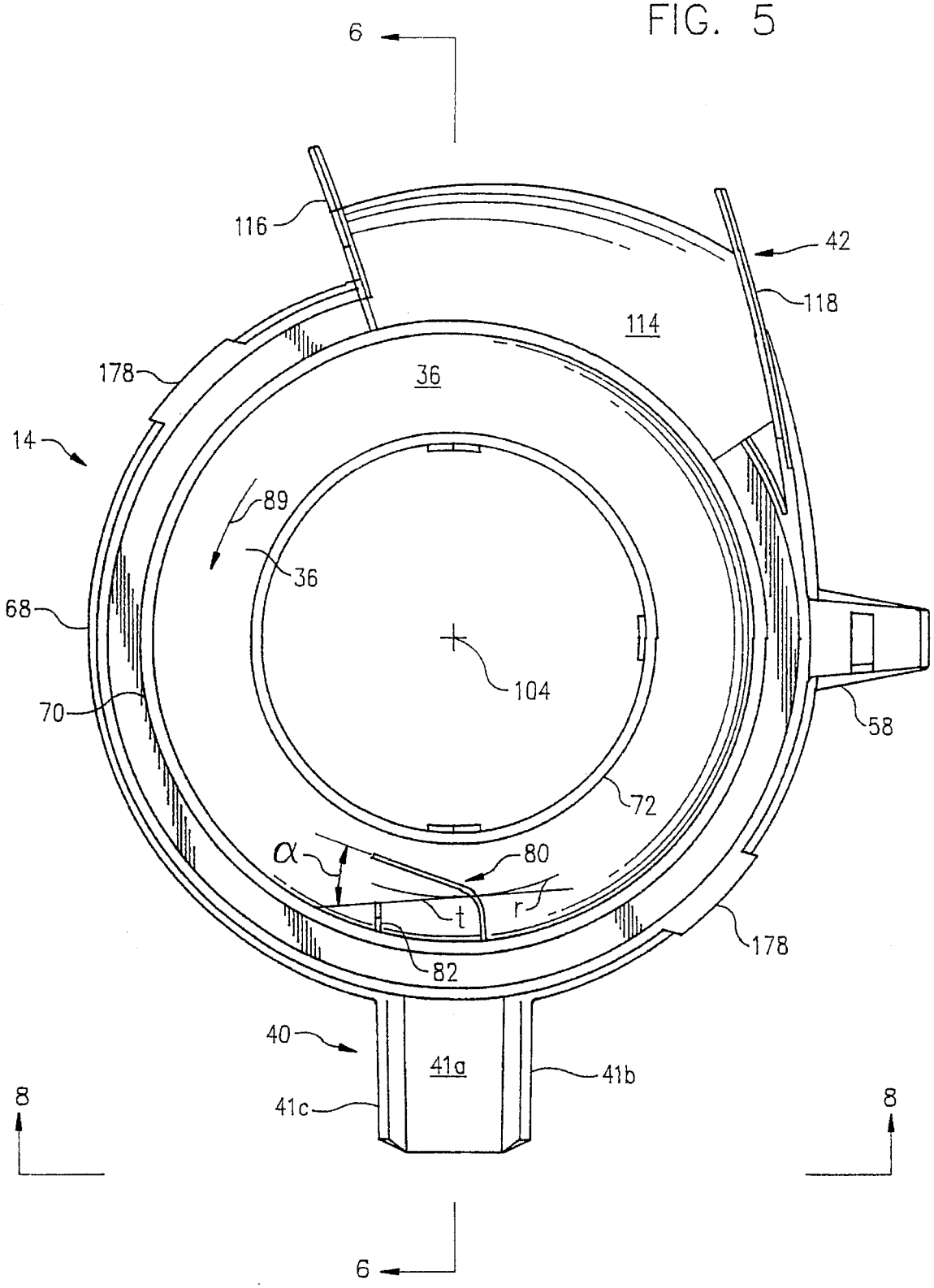
FIG. 5 is a top view of a juice bowl which is a component of the juice extractor of FIG. 1.

Centrifugal force generated by rotating knife basket 16 also causes juice expressed from the comestibles being processed to circulate rapidly around the sump 36 between inner wall 72 and splash wall 70 of juice bowl 14 in the direction indicated by arrow 89 in FIG. 5. Splashing of this juice through juice bowl outlet 38 is prevented by the just-mentioned juice baffle 80 and juice guide 82.

Juice baffle 80 extends upwardly from the bottom wall 74 of juice bowl 14 past juice outlet 38 to a level just below the top 90 of juice bowl inner wall 72. The juice baffle has one radially oriented segment 92 with an outer edge 94 which is located between juice outlet side edges 84 and 86 and extends inwardly from juice bowl splash wall 70 toward inner wall 72. A second, integral, circumferentially oriented segment 100 of juice baffle 80 is connected to the radial segment 92 by an also integral, arcuate, transition segment 102. The circumferentially extending segment 100 forms an acute angle $\alpha$ with a tangent t to a circle of radius r centered on the axis of rotation 104 of blade basket 16 and motor output shaft 22 (FIG. 5). As a consequence, the radial, transition, and inclined segments 92, 102, and 100 of juice baffle 80 cooperate with splash wall 70 to form a funnel with a closed end defined by baffle segment 92 and an open end 106 for juice circulating around juice bowl 14 in the arrow 89 direction. The rapidly circulating juice is thereby slowed and gently directed without splashing into spout 40 through juice outlet 38.

Juice baffle 80 also has the advantage that its circumferentially extending leg or segment 100 assists in keeping juice thrown from the lower reaches of blade basket 16 by centrifugal force from spraying through juice bowl outlet 38.

The cooperating juice guide 82 is employed to direct the circulating juice into the open end 106 of this funnel arrangement and against baffle 80 in a manner which contributes to the reduction of kinetic energy in the juice stream and the redirection of this stream without splashing through juice outlet 38 into spout 40.

Guide 82 is positioned: (a) upstream from that juice outlet side edge 84 first reached by juice circulating around juice bowl 14 in the arrow 89 direction, and (b) at the mouth 106 of the funnel-like formation provided by juice baffle 80 and juice bowl splash wall 70. The guide is radially oriented and extends upwardly from the bottom wall 74 of the juice bowl, inwardly from splash wall 70, and to a level above the bottom of rotating juice basket 16. The guide has a rounded upper end 110 and an inwardly inclined, exposed edge 112.

An integral, external, downwardly inclined projection 114 from juice bowl 14 forms the bottom wall of the pulp discharge chute 42. Integral, generally vertical, pulp chute side walls 116 and 118 are formed on opposite sides of ledge 114.

The juice bowl segment 58 of safety interlock column 54 is located on the outer wall 68 of the juice bowl. This segment extends the entire height of wall 68.

Figure 4:
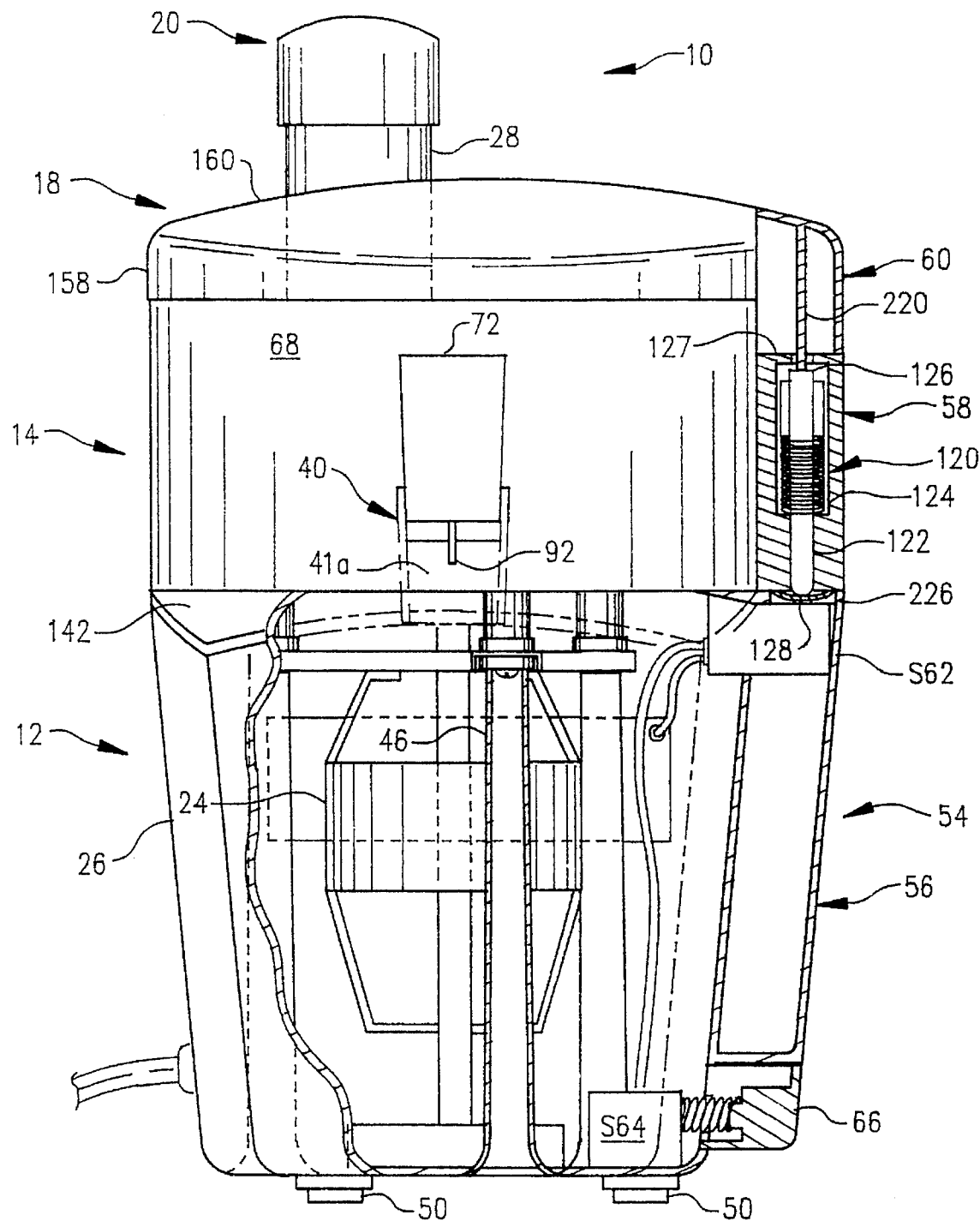
FIG. 4 is an end view of the FIG. 1 juice extractor with part of the extractor base casing, juice bowl, and juice bowl cover broken away to show certain of the internal juice extractor components.

Housed in juice bowl interlock segment 58 is a plunger assembly 120 comprising a rectilinearly displaceable plunger 122 surrounded by a biasing spring 124 (FIG. 4). Spring 124 biases plunger 122 to an "up" position in which its rounded upper end 126 abuts a travel limiting partition 127 in interlock segment 58 and its lower end 128 is retracted. The plunger is displaced against the bias of spring 124 to an interlock switch-actuating "down" position by the locking of juice bowl cover 18 to juice bowl 14 after the bowl is locked to juice extractor base 12. When juice bowl cover 18 is removed, biasing spring 124 moves the plunger back to the up position. This results in safety interlock switch S62 opening and preventing the operation of juice extractor motor 24 under unsafe operating conditions.

A system 130 for locking juice bowl 14 to juice extractor base 12 (see FIGS. 2 and 3A) includes detents 132 which extend inwardly from inner wall 72 of juice bowl 14. Seating the juice bowl on base 12 and then rotating the bowl traps these detents in cooperating juice extractor base cavities 134. These cavities are defined by upper and lower, circumferentially extending ledges 136 and 138 on a cylindrical segment 140 extending upwardly from the top wall 142 of housing 26. The details of this juice bowl supporting and coupling system are not part of the present invention and are disclosed in detail in the '572 application. For those reasons, the system in question will be further described herein only to the extent necessary for a complete understanding of the present invention.

Blade basket 16 (FIGS. 2 and 3B) includes: (a) a base 144; (b) filter 32, typically a frustoconical, stainless steel screen; and (c) a stainless steel blade disk 146 containing the knife blades 30. Those are integral with and extend upwardly from the body of the disk. The blade basket components are aligned along and rotated about the axis of rotation 104 when the blade basket is coupled to motor output shaft 22 and juice extractor motor 24 is running.

Base 144 has an outwardly and downwardly extending, cylindrical rim 150; an integral blade dish and filter support 152; and a hub 154 integrally formed on the bottom of filter support 152.

The rim 150 of blade basket 16 extends down over juice bowl inner wall 72 as is best shown in FIG. 2. The illustrated relationship between blade basket 16 and juice bowl inner wall 72 inhibits leakage of juice from bowl 14 through the gap 155 between the base 144 of blade basket 16 and juice bowl inner wall 72.

Blade basket hub 154 is generally cylindrical. The inner diameter of this hub is slightly larger than that of the drive hub 157 attached to the upper end of motor output shaft 22. This allows blade basket hub 154 to fit snugly over drive hub 157 in the course of drive-coupling the blade basket to the drive hub. The specific system employed to couple (or drive connect) blade basket 16 to motor output shaft 22 is not part of the present invention, is disclosed in detail in the '572 application, and will therefore be described further herein only to the extent required for an understanding of the present invention.

The juice bowl cover 18, best shown in FIGS. 1, 2, 3A, 4, and 11, is preferably fabricated from clear plastic so that the operation of juice extractor 10 can be observed by the operator. It has a generally cylindrical, vertically oriented peripheral or side wall 158; a top wall 160; the juice bowl cover segment 60 of interlock column 54; feed tube 28; diametrically opposed, bayonet type, cover-to-juice bowl locking systems 162 and 164 for securing cover 18 to juice bowl 14; and a cover 166 for pulp discharge chute 42.

Locking systems 162 and 164 each have a juice bowl cover-associated fitting 168 at the lower edge of juice bowl cover side wall 158. Each fitting has an inwardly opening, circumferentially extending recess 170 formed by integral, spaced, upper flange segments 172 (one shown in FIGS. 13 and 15); an integral, lower flange 174; and an integral, vertically oriented, flange connecting portion 176. With cover 18 seated on and rotated about axis 104 relative to juice bowl 14, a complementary, circumferentially extending fitting 178 on the exterior of juice bowl outer wall 68 and adjacent its upper edge 179 is trapped in recess 170 between the two flange segments 174 and flange 176, locking cover 18 to juice bowl 14.

Each juice bowl-associated fitting 178 (FIG. 9) has a circumferentially extending base 180 with a rounded end 182 which is a lead-in for juice bowl cover 18; a set of depending, spaced apart fingers 184a–d which are integral with base 180 and are separated by relieved areas 185a–c; and an also integral, depending, but longer element 186 spaced from finger 184d by relieved area 187 in the direction juice bowl cover is rotated in locking it to juice bowl 14. Fingers 184a–d take up any slack between cover 18 and juice bowl 14, producing a tight, leak-inhibiting fit between the juice bowl and its cover. Element 186 is a stop which is engaged by the lower flange 174 of the fitting 168 on the juice bowl cover when the latter reaches its locked position. A detent arrangement (not shown) of the character described in the '572 application ensures that cover 18 remains in the locked position until it is deliberately removed from juice bowl 14.

This novel locking arrangement has the advantages that fitting 178 is easy to mold and that fingers 184a–d offer less frictional resistance to rotation of cover 18 than a solid element of equal length. This significantly facilitates the assembly of cover 18 to juice bowl 14 and the removal of the cover without any sacrifice in the ability to maintain a tight fit between the cover and the juice bowl.

With juice bowl cover 18 seated on and locked to juice bowl 14, a circumferentially extending, horizontal ledge 188 in juice bowl cover side wall 158 rests on the upper edge 179 of juice bowl outer wall 68; and the lower segment 192 of the juice bowl cover side wall fits within and is closely surrounded by the upper segment 194 of juice bowl outer wall 68. This fitting of the juice bowl cover side wall 158 within the juice bowl is another important feature of the present invention as it keeps juice from leaking through the gap 196 between juice bowl 14 and juice bowl cover 18.

Figure 10:
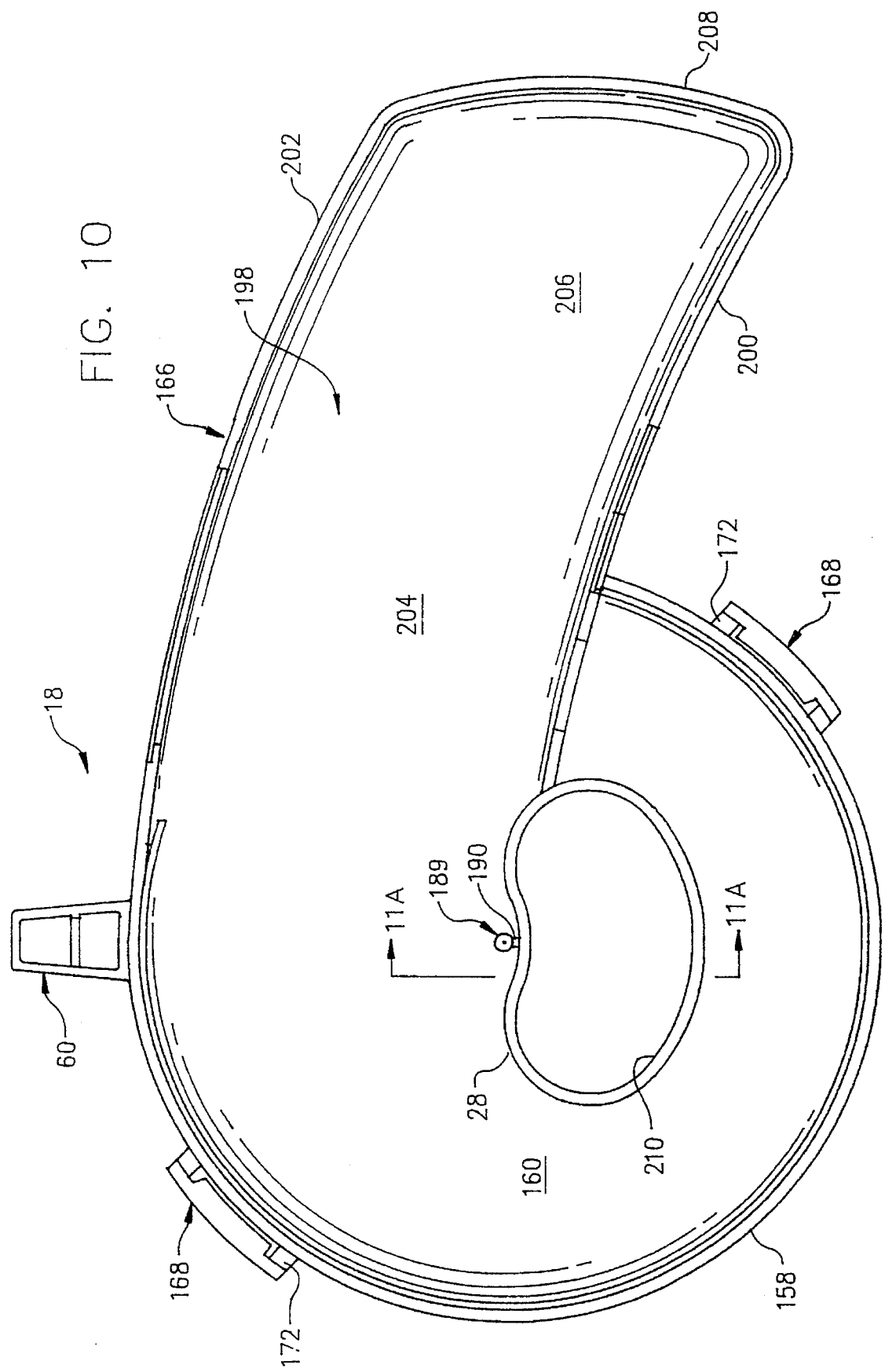
FIG. 10 is a bottom view of a juice bowl cover which is another component of the juice extractor illustrated in FIG. 1.

The cover 166 for pulp chute 42 is integral with and extends beyond the peripheral wall 158 of juice bowl cover 18. This cover has a top wall 198 sandwiched between integral side walls 200 and 202. These side walls rest on, and mate with, pulp chute side walls 116 and 118 when cover 18 is assembled to juice bowl 14. Pulp chute cover 166 thus cooperates with chute 42 to confine and direct pulp discharged from blade basket 16 into pulp container 44 through the opening 203 defined by the rim 150 of blade basket 16 and the top and side walls 198, 200, and 202 of pulp chute cover 166 (FIGS. 2 and 10).

Figure 11:
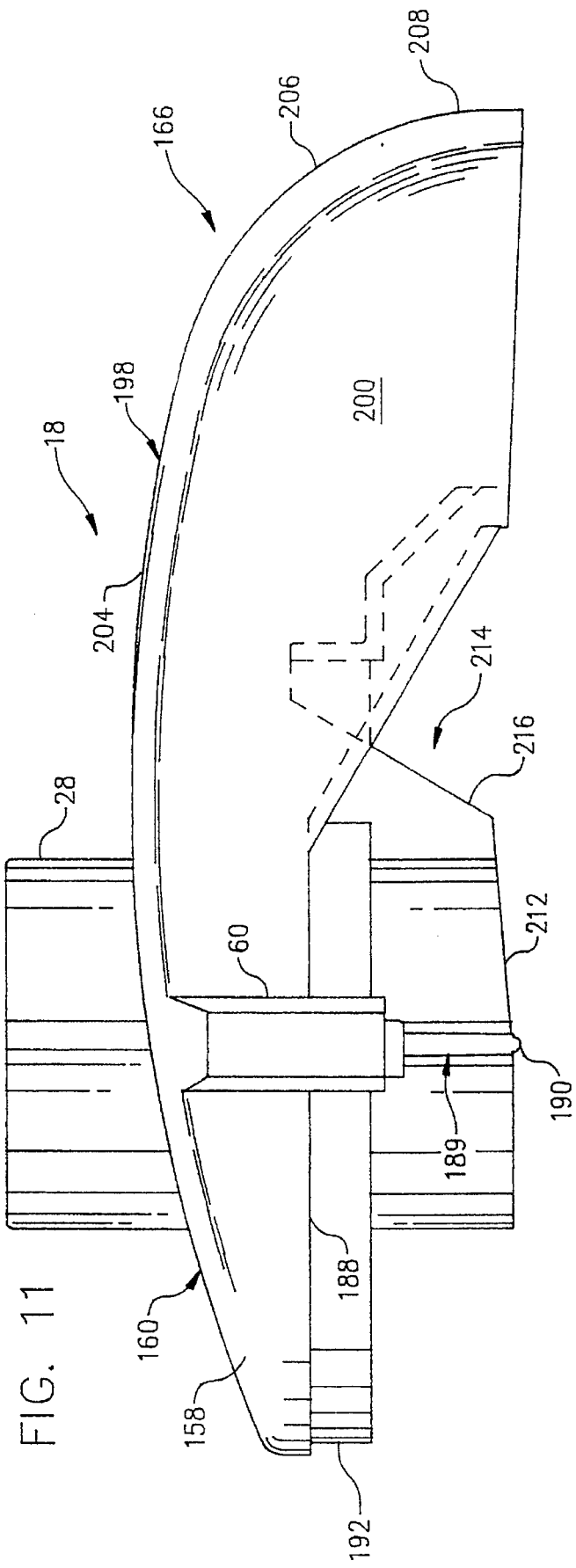
FIG. 11 is a side view of the juice bowl cover.

As shown in FIGS. 1, 2, and 11, the top wall 198 of pulp chute cover 166 has a generally horizontal convex segment 204 which transitions smoothly through a curved outlet end segment 206 into a generally vertical end wall segment 208. This smooth, corner-free, chute cover configuration keeps pulp from hanging up in pulp chute 42 and is accordingly an important feature of the present invention.

Feed tube 28 extends through an opening 210 in the top wall 160 of juice bowl cover 18. The bottom end 212 of the feed tube 28 is parallel to, and approximately one mm above, the blades 30 on blade disk 146 at its closest point.

Figure 3A:
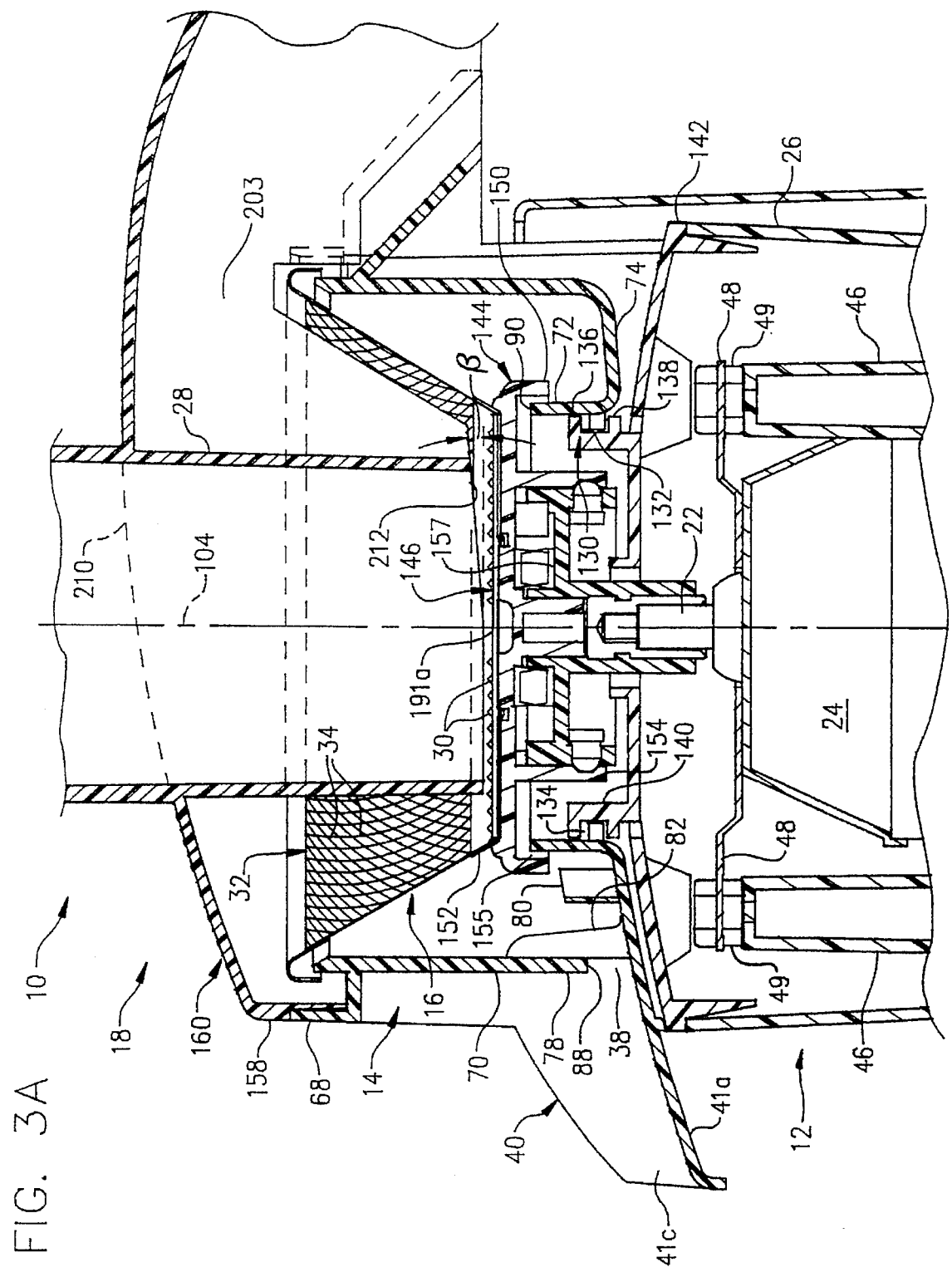

Beginning at a fore-and-aft location coincident with axis of rotation 104, the bottom end 212 of feed tube 28 is angled upward by at an angle β, typically 5° (FIG. 3A). This helps to ensure that blades 30 will not engage and damage the feed tube if blade basket 16 should move upwardly during the operation of juice extractor 10 because of movement in the motor-supporting grommets 49 or for some other reason.

A scraper/deflector 214 (FIG. 11) keeps pulp from building up on blade basket filter 32 and helps to move pulp out of the rotating filter basket. Scraper/deflector 214 is integral with and extends downwardly from juice bowl cover top wall 160 to the level of feed tube bottom end 212. Laterally, it extends from blade basket filter 32 to the feed tube.

The slanted outer edge 216 of deflector/scraper 214 matches the angle of filter 32. This edge is located closely adjacent the filter so that it will efficiently scrape off pulp trapped on the filter.

The interlock segment 60 of juice bowl cover 18 has a box-like element 218 and an integral, downwardly projecting, interlock actuator cam 220. As juice bowl cover 18 is rotated to lock the cover to juice bowl 14, cam 220 engages the upper end 126 of interlock plunger 122 and displaces the plunger downwardly against the bias exerted by spring 124. That closes interlock switch S62 if juice bowl 14 is also correctly assembled to juice extractor base 12.

Feed plunger 20 (FIG. 1) is a hollow plastic component with a closed bottom (not shown). The configuration of the plunger complements the configuration of feed tube 28. Plunger 20 slides in feed tube 28 and is used to push the comestibles being processed into contact with the blades 30 of blade basket 16.

The first step in using juice extractor 10 is to assemble juice bowl 14 to juice extractor base 12. This is done by seating the juice bowl on base 10 and then rotating it until detents 132 are seated in cavities 134 to lock the juice bowl to the base. In this locked position, the juice bowl interlock segment 58 is so aligned with the base interlock segment 56 that the interlock plunger 122 (FIG. 4) is directly above, but does not contact, the actuator 226 of interlock switch S62.

The next step in the assembly process is to place blade basket 16 in juice bowl 14 and couple the blade basket hub 154 to the drive hub 157 on the upper end of motor output shaft 22. This is accomplished by aligning the blade basket 16 along the axis of rotation 104 of motor 24 and blade basket 16. The blade basket 16 is then displaced downwardly until the base 144 of the blade basket 16 is just above the bottom wall 74 of juice bowl 14 and rotated as necessary to engage the drive and driven elements on the two hubs. At this point, the juice basket 16 is coupled to drive motor output shaft 22 and locked to juice extractor base 12 by bowl-to-base locking system 130.

Figure 13:
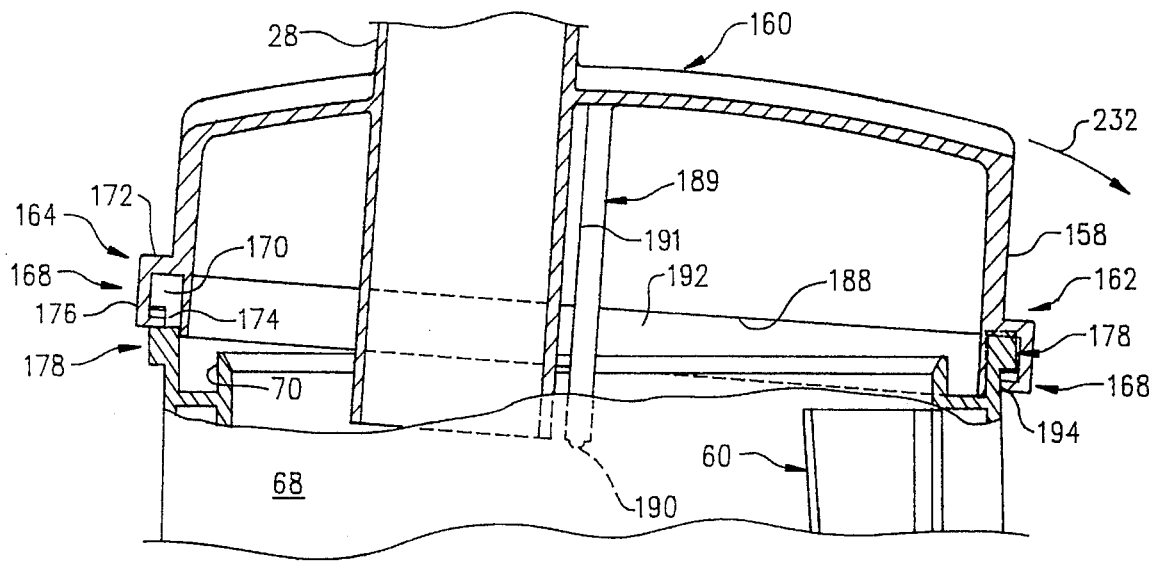
FIG. 13 is a similar view of the juice extractor illustrated in FIG. 1, showing how a novel relationship between the juice bowl and the juice bowl cover keeps the cover from being misassembled to the juice bowl.
Figure 15:
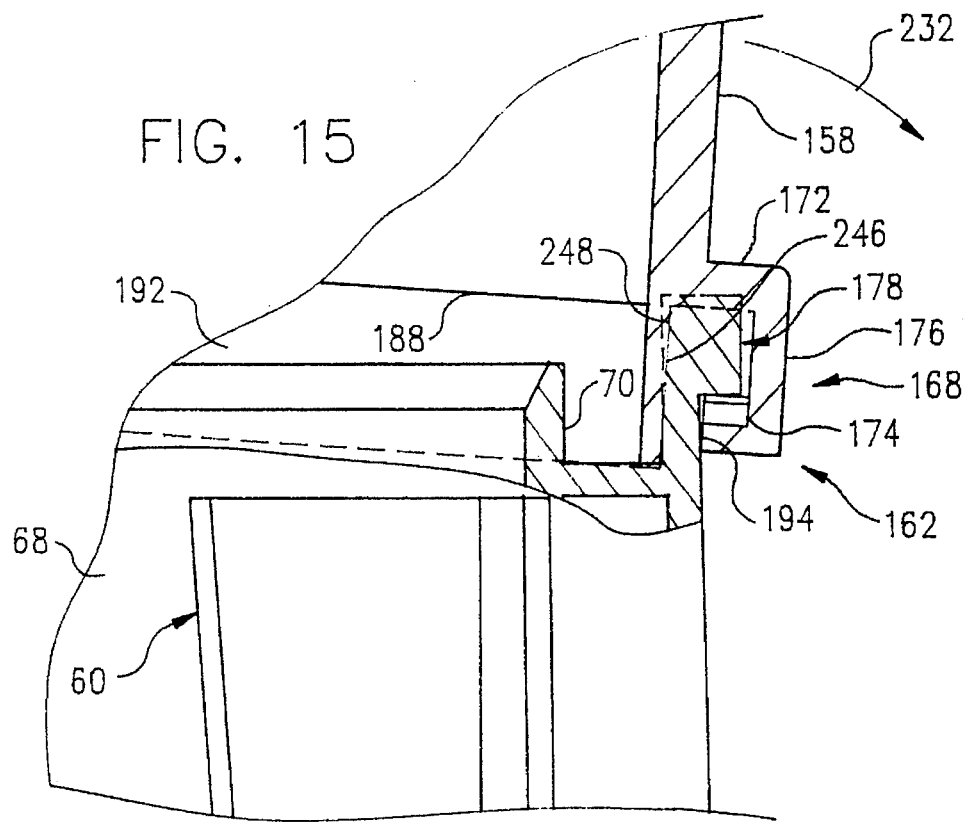

The juice bowl cover 18 is then mounted on juice bowl 14. Initially, cover 18 is placed on bowl 14 with pulp chute cover 166 angularly offset from chute 42, the ledge 188 in the side wall 158 of juice bowl cover 18 seated on the upper edge 179 of juice bowl outer wall 68, and the lower segment 192 of the cover side wall 158 surrounded by the outer juice bowl wall upper segment 194. Cover 18 is then rotated until the juice bowl integrated fittings 178 of coupling systems 162 and 164 are trapped between the upper flange segments 172 and lower flange 174 of juice bowl cover-associated fittings 168 (FIGS. 13 and 15).

With juice bowl cover 18 locked to bowl 14, the juice bowl cover interlock segment 60 is aligned with the juice bowl interlock segment 58; and interlock actuator cam 220 contacts interlock plunger upper end 126, displacing the plunger downwardly against the bias of spring 124. The interlock plunger lower end 128 thereupon engages the actuator 226 of interlock switch S62, depressing the actuator and closing the interlock switch. Accordingly, locking cover 18 to juice bowl 14 allows power to be applied to juice extractor motor 24 by manually closing main switch S64 if the juice bowl has theretofore been properly locked to base 12.

Also, when interlock plunger 122 is depressed, its lower end 128 protrudes into juice bowl interlock segment 58. This prevents rotation of bowl 14 relative to juice extractor base 12 and affords safe operation of juice extractor 10 as long as its motor 24 is running.

Referring now to FIGS. 5, 10, and 12–15, it was pointed out above that juice extractor 10 has two diametrically opposed juice bowl cover-to-juice bowl locking systems 162 and 164. One of these—identified by reference character 162—is located adjacent motor safety interlock column 54. The other (164) is located near pulp discharge chute 42.

Figure 12:
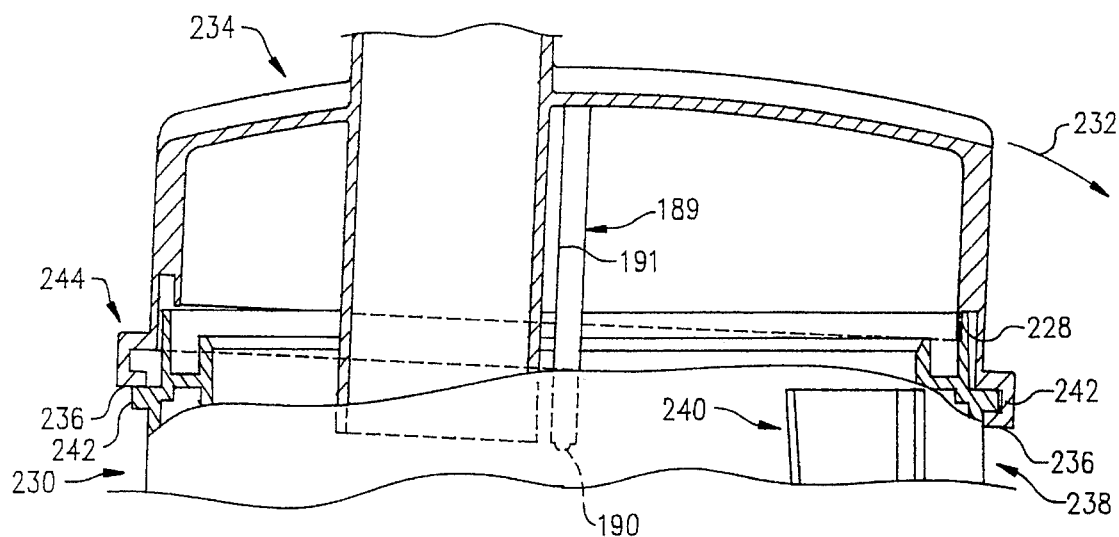
FIG. 12 is a fragmentary section through a prior art juice extractor, showing how the cover of the extractor can be assembled to the juice bowl in a manner which allows the juice extractor motor to operate even though the cover is not properly locked to the juice bowl.
Figure 14:
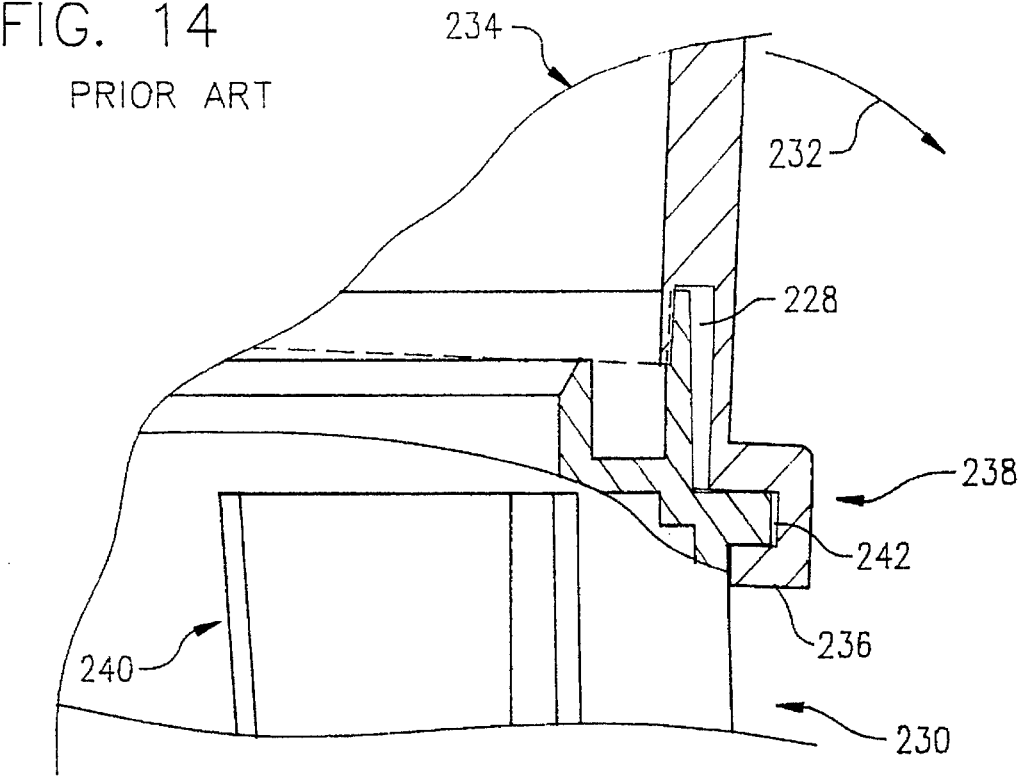
FIGS. 14 and 15 are fragments of FIGS. 12 and 13 drawn to an enlarged scale.

A similar dual locking arrangement is employed in those juice extractors disclosed in the '572 application. As is shown in FIGS. 12 and 14, the vertical wall 228 of the juice bowl 230 employed in a juice extractor as disclosed in the '572 application has a relatively thin section. That wall can accordingly bend in the direction indicated by arrow 232 as the juice bowl cover 234 of the juice extractor is assembled to its juice bowl 230. As a consequence, the flange-like, cover-associated locking element 236 of the locking system 238 adjacent interlock column 240 can be properly trapped beneath the juice bowl-associated projection 242 of the locking system with the bending of juice bowl cover side wall 228 at the same time allowing the cover-associated locking member 236 of the diametrically opposed locking system 244 to ride over the juice bowl-associated locking member 242 of that system as the juice bowl cover is rotated. As a consequence, it is possible to so assemble the covers of the juice extractors disclosed in the '572 application to their juice bowls as to align the interlock segments and close the interlock switch of the extractor without both of the diametrically opposed connections being made. The juice extractor motor can then be turned on by closing the main, manually operated switch, even though the juice bowl cover is not properly assembled and coupled to the juice bowl.

This has a number of disadvantages. The cover may come off during the operation of the juice extractor, exposing the operator to possible injury by the blades in the rotating knife basket. Also, this misassembly of the juice cover to its bowl creates gaps through which juice may spray onto the work surface or onto the operator of the juice extractor.

It is not possible to misassemble the juice bowl cover 18 of juice extractor 10 to juice bowl 14 in the manner discussed above. To do this, the juice bowl cover 18 would have to be tilted in the arrow 232 direction (FIGS. 13 and 15)

to such an extent that the outer surface 246 of the juice bowl cover lower side wall segment 192 would move to the position indicated by reference character 248.

With cover 18 thus oriented relative to juice bowl 14, the cover cannot be rotated to the locked position required to close safety interlock switch S62. FIGS. 13 and 15 show that this would require an actual displacement of the material of cover side wall segment 192 and/or the material of juice bowl side wall segment 194, not merely the bending of a side wall segment. The force required to displace the material of the juice bowl cover exceeds that which an operator is capable of exerting, thus eliminating the possibility of cover-to-juice bowl misassembly.

With juice bowl 14 and blade basket 16 mounted on juice extractor base 12, juice bowl cover 18 assembled to bowl 14, and interlock switch S62 consequently closed, juice extractor 10 is available to separate comestibles into juice and pulp. To accomplish this, power is applied to juice extractor motor 24 by depressing actuator 66 to close main switch S64. Motor 24 and blade basket 16 come up to operating speed in approximately one second; and comestibles can then be processed into juice by feeding them through feed tube 28 with plunger 20.

Using a feed plunger to force the comestibles against the blades 30 in rotating blade basket 16 has two salutary effects. First, it keeps the user's hands away from blades 30. Second, it ensures that the comestibles are efficiently and completely comminuted because of the close proximity to the blade basket knives 30 which the plunger can reach.

Comestibles introduced into blade basket 16 through feed tube 28 contact the blades 30 on blade disk 146. These blades comminute the comestibles into fine pieces, facilitating the release of juice. The juice is expressed by centrifugal force and passes through filter 32, leaving the pulp in blade basket 16.

Pulp built up on filter 32 is removed by scraper/deflector 44. Because the scraper/deflector is located adjacent that side of pulp chute 42 facing the direction of rotation of blade basket 16, pulp is deflected over the rim 150 of blade basket 16 into pulp discharge chute 42 as blade basket 16 is filled with the pulp.

The juice passed through filter 32 collects in juice bowl sump 36 and flows through juice bowl outlet 38 into spout 40. Splash guard 78, baffle 80, and guide 82 prevent juice propelled from blade basket 16 by centrifugal force from splashing through outlet 38. A container (not shown) is placed below spout 40 to collect the juice.

While motor 24 is operating, its vibration and that generated by the rotating blade basket 16 is damped by the resilient grommets 49 between motor supports 46 and motor mounting flanges 48 and by vibration absorbing feet 50. Juice extractor 10 thus remains stationary during operation on the surface on which it is placed.

A vertically extending postlike stop 189 with a rounded lower end 190 is so connected to feed tube 28 by an integral wall 191 that the lower end 190 of the stop is positioned above the knife blade-free center section 191a of blade disk 146 in assembling juice bowl cover 18 to juice bowl 14 (FIGS. 3A and 11A). If blade basket 16 has not been depressed in assembling it to drive hub 157 to the extent required to complete to the drive connector, the lower end 190 of post 189 will engage the drive disk center section as cover 18 is installed, displacing the blade basket downwardly to complete the drive connection and lock the blade basket in place. Also, if the blade basket should by chance jounce or vibrate upwardly during the operation of juice extractor 10, the lower end 190 of integral post 189 will limit the upward movement of the blade basket and keep the blades 30 on disk 146 from damaging the lower end 212 of feed tube 28.

After the process of separating the comestibles into juice and pulp has been completed, the actuator 66 of main switch $64 is again depressed. This opens the main switch and cuts power to juice extractor motor 24.

Figure 19:
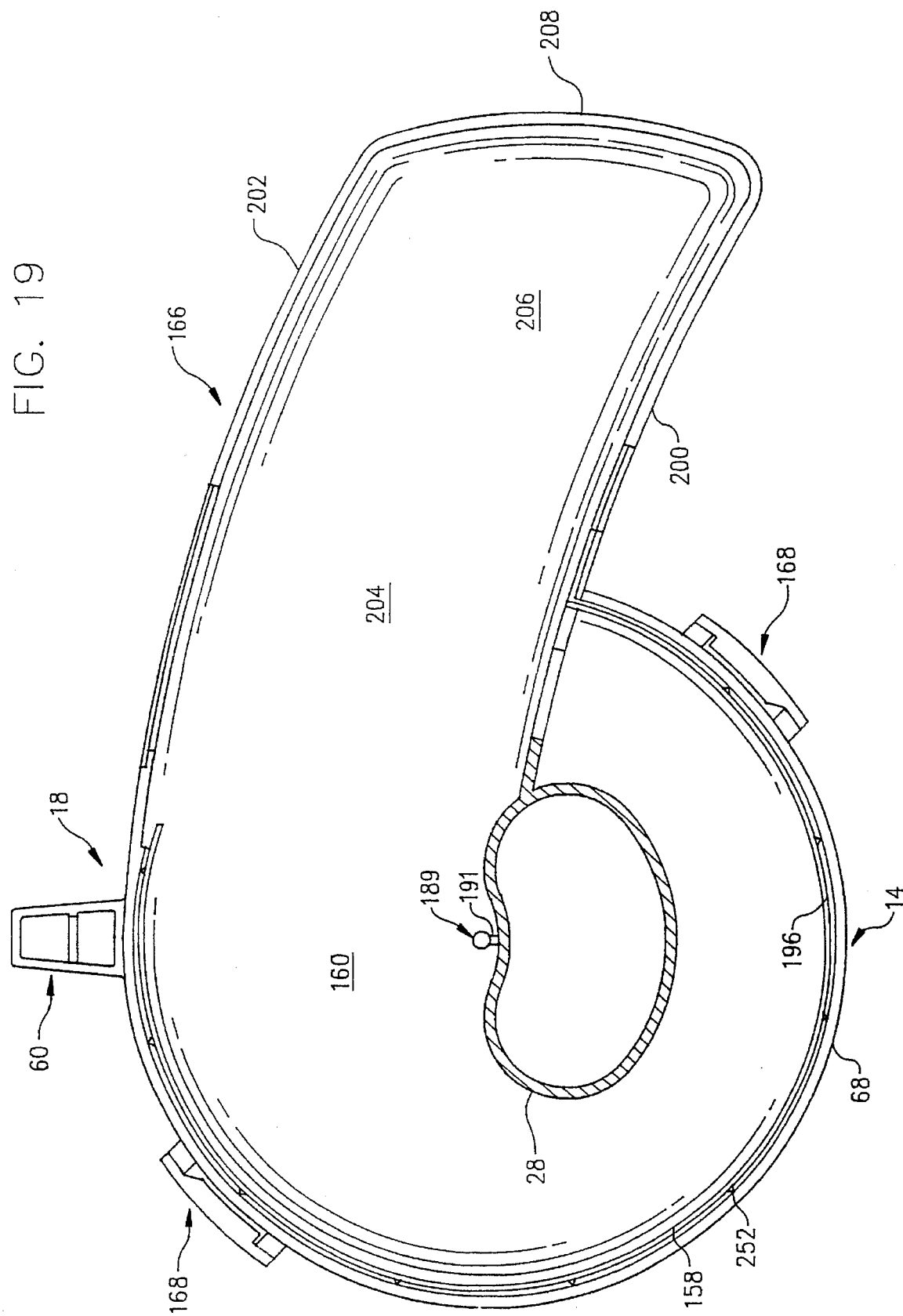
FIG. 19 is a section through the juice bowl/cover assembly, taken substantially along line 19—19 of FIG. 16.

Referring now to FIGS. 18 and 19, the lower depending side wall segment 192 of juice bowl cover 18 typically fits somewhat snugly in the upper side wall segment 194 of juice bowl 14. This may allow juice to escape through the gap 196 between the juice bowl cover and juice bowl side walls 158 and 68 by capillary action, a phenomenon promoted by the vibration present with the juice extractor operating. This leakage is forestalled by the vertically oriented, integral, radially extending, wedge-shaped features 252 with sharp outer edges 254 shown in FIGS. 18 and 19 and employed in the alternate version of cover 18 shown in those figures. Those features are located at intervals around the circumference of juice bowl cover side wall segment 192 immediately below ledge 188. Integral features 252 separate the juice bowl cover and juice bowl side wall segments when cover 18 is assembled to juice bowl 14. That provides a gap 196 therebetween which is sufficiently wide to effectively eliminate leakage by capillary action.

Also, as is apparent from FIG. 19, integral features 252 facilitate that downward displacement of cover 18 relative to juice bowl 14 employed to assemble the cover to the juice bowl, particularly in those circumstances in which the facing cover and juice bowl side wall segments are not perfectly complementary because of manufacturing inconsistencies or for other reasons. The wedging action of features 252 as cover 18 moves downwardly forces the cover and juice bowl segments 192 and 194 as necessary into a correctly spaced, complementary relationship.

It is also possible to form the features which mitigate against capillary action and facilitate the assembly of the juice bowl cover to the juice bowl on the wall of the latter. In this case, those feature can be of the same configuration as the wedge-shaped cover-associated features 252 described above but inverted with the points of the features on the top and the blunt bases on the bottom.

Beginning at the level of the bottom ends 256 of cover integrated features 252, the juice bowl cover lower segment 192 has a lower portion 258 which is tapered inwardly in a smooth curve 260 as is shown in FIG. 16 and more clearly in FIG. 17. This also increases the separation between the juice bowl cover and juice bowl segments 192 and 194, further guarding against the leakage of juice through the juice bowl/juice bowl cover gap 196 by capillary action.

The possibility of juice escaping through gap 196 by capillary action is also forestailed by an upwardly opening, circumferential recess 262 in juice bowl bottom wall 74 immediately adjacent juice bowl side wall segment 194 (FIGS. 16 and 17). This recess separates the lower edge of juice bowl cover side wall segment 192 from the juice bowl bottom wall 74 to a degree which mitigates against capillary migration of juice between those two elements.

The invention may be embodied in many forms without departing from the spirit or essential characteristics of the invention. The present embodiments are therefore to be considered in all respects as illustrative and not restrictive, the scope of the invention being indicated by the appended claims rather than by the foregoing description; and all changes which come within the meaning and range of equivalency of the claims are therefore intended to be embraced therein.

What is claimed is:

1. A juice extractor comprising:

a base which includes a motor;

means for extracting juice from comestibles, said juice extracting means being drive-connected to said motor;

a juice bowl for collecting extracted juice, said juice bowl being lockable to said base in surrounding relationship to the juice extracting means;

a cover which is removably installable on the juice bowl;

safety interlock means for activating said motor only if said juice bowl is locked to the juice extractor base and the cover is installed on and locked to the juice bowl; and separate and independent systems spaced at intervals around the extractor for locking the juice bowl cover to the juice bowl, said locking systems each having interengageable cover- and juice bowl-incorporated components and the components of the separate locking means being so configured that the engagement of the components of one of said locking systems requires the simultaneously engaging of the components of all of said locking systems.

2. A juice extractor as defined in claim 1 in which the interengageable components of each said locking system are engageable by first seating the cover on and then rotating it relative to the juice bowl and the interchangeable components are sufficiently rigid to preclude component engaging rotation of said cover unless said cover is so completely seated on said cover as to enable said simultaneous engagement of the components of all of said locking systems.

3. A juice extractor as defined in claim 2 in which:

the cover incorporated component of each said locking system comprises spaced apart, radially and circumferentially extending upper and lower flange means; and the bowl-incorporated associated component of each said locking system comprises a fitting which is trappable between the flanges of the cover-associated component in the same locking system and which has circumferentially spaced, flange means engagable elements of successively greater length which are successively engaged by the lower flange means to clamp said cover against said bowl as the cover is rotated relative to the bowl.

* * * * *